US009018527B2

(12) United States Patent
Komiya

(10) Patent No.: US 9,018,527 B2
(45) Date of Patent: Apr. 28, 2015

(54) CABLE PROTECTION AND GUIDE DEVICE

(71) Applicant: Tsubakimoto Chain Co., Osaka (JP)

(72) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 14/088,451

(22) Filed: Nov. 25, 2013

(65) Prior Publication Data

US 2014/0174783 A1 Jun. 26, 2014

(30) Foreign Application Priority Data

Dec. 21, 2012 (JP) ................................ 2012-280020

(51) Int. Cl.
| H02G 3/04 | (2006.01) |
| F16G 13/00 | (2006.01) |
| F16L 3/00 | (2006.01) |
| H02G 11/00 | (2006.01) |

(52) U.S. Cl.
CPC ............ *H02G 3/0406* (2013.01); *H02G 11/003* (2013.01); *H02G 3/0475* (2013.01)

(58) Field of Classification Search
CPC ...... F16L 3/015; H02G 11/00; H02G 11/006; H02G 3/0475; F16G 13/16
USPC ................... 174/68.3, 70 R, 72 A, 75 R, 135; 361/826; 248/70, 68.1, 49, 51; 58/78.1, 58/79.1
See application file for complete search history.

(56) References Cited

U.S. PATENT DOCUMENTS

| 3,590,854 A | * | 7/1971 | Cork ......................... 137/355.16 |
| 4,186,553 A | * | 2/1980 | Fitchett .......................... 59/78.1 |
| 4,582,281 A | * | 4/1986 | Van Camp ....................... 248/51 |
| 4,625,936 A | * | 12/1986 | Hadden, Sr. ................... 248/544 |

FOREIGN PATENT DOCUMENTS

| JP | H05-038034 | 2/1993 |
| JP | 4658221 | 3/2011 |

* cited by examiner

*Primary Examiner* — Angel R Estrada
*Assistant Examiner* — Dimary Lopez Cruz
(74) *Attorney, Agent, or Firm* — Jianq Chyun IP Office

(57) ABSTRACT

A cable protection and guide device, which prevents abrasion of the cable skin of a cable or the like and holds the position of a multi-joint link with high precision, is provided. The multi-joint link includes a link member and a holding member attached to the link member for holding the cable. The holding member has a base part to be engaged with a link side locking part and a holding part that extends from the base part, wherein the base part and the holding part are integrally formed. One of the link side locking part and the base part includes a pair of locking concaves arranged in the multi-joint link width direction while the other one includes a pair of locking claws arranged in the multi-joint link width direction and extending in a link flexional inner-outer direction to be engaged with the locking concaves respectively.

7 Claims, 7 Drawing Sheets

CABLE PROTECTION AND GUIDE DEVICE

CROSS-REFERENCE TO RELATED APPLICATIONS

This application claims the priority benefit of Japan application serial no. 2012-280020, filed on Dec. 21, 2012. The entirety of the above-mentioned patent application is hereby incorporated by reference herein and made a part of this specification.

BACKGROUND OF THE INVENTION

1. Field of the Invention

The present invention relates to a cable protection and guide device that securely protects and guides a flexible cable, such as an electric cable for transmitting electric signals or supplying electricity or a hose for supplying oil or air pressure, which connects a movable portion and a fixed portion of an industrial machine or a vehicle, etc.

2. Description of Related Art

According to the prior art, a known cable protection and guide device is provided with a multi-joint link that is formed by connecting a plurality of link members in a cable longitudinal direction, and the cable protection and guide device guides a cable or the like from a cable fixed end to a cable movable end and is capable of taking a linear position to be in contact with a support surface of a support body and a flexional position to be separated from the support surface (Patent Literatures 1 and 2, for example).

The conventional cable protection and guide device accommodates and guides the cable in the interior with flexibility.

PRIOR ART LITERATURE

Patent Literature

[Patent Literature 1] Japanese Patent Publication No. 5-38034
[Patent Literature 2] Japanese Patent No. 4658221

SUMMARY OF THE INVENTION

Problem to be Solved

However, due to the structure that accommodates the cable in the interior with flexibility, the aforementioned conventional cable protection and guide device faces the problems that the cable skin of the cable may be worn to generate powder when the cable movable end is moved and causes the cable and the cable protection and guide device to slide on each other, and that the cable protection and guide device may have increased size and relatively larger mass in order to accommodate the cable therein, which results in a greater inertial force when the cable movable end is moved and makes it difficult to hold the position with high precision.

Considering the aforementioned issues, the present invention provides a cable protection and guide device that prevents abrasion of the cable skin of the cable and holds the position of the multi joint link with high precision.

Solution to the Problem

In view of the above, a cable protection and guide device according to a first aspect of the present invention is provided to construct a multi-joint link with a plurality of link members connected in a cable longitudinal direction. The cable protection and guide device guides a cable or the like from a cable fixed end to a cable movable end, and is capable of taking a linear position to be in contact with a support surface of a support body and a flexional position to be separated from the support surface. The multi-joint link includes the plurality of link members and a holding member, which is attached to at least one part of the plurality of link members and holds the cable. The at least one part of the plurality of link members includes a connection pin formed at one end side thereof in the cable longitudinal direction, a pin hole formed at the other end side thereof in the cable longitudinal direction to be rotatably engaged with the connection pin, and a link side locking part disposed between the connection pin and the pin hole in the cable longitudinal direction. The holding member includes a base part to be engaged with the link side locking part and a holding part, which extends from the base part toward two outer sides of a multi-joint link width direction and is in contact with the cable to hold the cable, and the base part and the holding part are formed integrally with each other. One of the link side locking part and the base part includes a pair of locking concaves arranged in the multi-joint link width direction while the other one of the link side locking part and the base part includes a pair of locking claws arranged in the multi-joint link width direction and extending in a link flexional inner-outer direction to be engaged with the pair of locking concaves respectively.

According to a second aspect of the present invention, in addition to the aforementioned structure of the cable protection and guide device of the first aspect, one of the at least one part of the plurality of link members and the holding member includes an engaging pin that extends in the link flexional inner-outer direction while the other one of the at least one part of the plurality of link members and the holding member includes an engaging hole that extends in the link flexional inner-outer direction to be engaged with the engaging pin.

According to a third aspect of the present invention, in addition to the aforementioned structure of the cable protection and guide device of the first or second aspect, the holding part of the holding member includes two or more cable insertion holes, which are arranged in the cable longitudinal direction and penetrate the holding part in the link flexional inner-outer direction, and has flexibility, and the cable is alternately inserted into the holding member in the link flexional inner-outer direction.

According to a fourth aspect of the present invention, in addition to the aforementioned structure of the cable protection and guide device of the first or second aspect, the holding part of the holding member includes a plurality of through holes that are arranged in the multi joint link width direction and penetrate the holding part in the link flexional inner-outer direction, and the cable is inserted into a fixing band that is a member other than the holding member and inserted into the through hole.

According to a fifth aspect of the present invention, in addition to the aforementioned structure of the cable protection and guide device of any one of the first to the fourth aspects, a center line of the cable overlaps a line that connects the connection pin and the pin hole of the at least one part of the plurality of link members when a portion of the multi-joint link in the linear position is viewed from the multi-joint link width direction.

According to a sixth aspect of the present invention, in addition to the aforementioned structure of the cable protection and guide device of any one of the first to the fifth aspects, the holding member is formed of a flexible material, and a link flexional outmost part of the holding member is disposed outer to a link flexional outmost part of the at least one part of the plurality of link members.

According to a seventh aspect of the present invention, in addition to the aforementioned structure of the cable protection and guide device of any one of the first to the sixth aspects, the holding member is installed to the at least one part of the plurality of link members from a link flexional inner side.

Effect of the Invention

The cable protection and guide device of the present invention, which has the multi-joint link formed by connecting multiple link members in the cable longitudinal direction and guides the cable from the cable fixed end to the cable movable end and is capable of taking the linear position to be in contact with the support surface of the support body and taking the flexional position to be separated from the support surface, not only can protect and guide the cable but also have the following particular effects.

In the cable protection and guide device of the first aspect of the present invention, the multi joint link includes the plurality of link members and the holding member, which is attached to the at least one part of the plurality of link members and holds the cable. The at least one part of the plurality of link members includes the connection pin formed at one end side thereof in the cable longitudinal direction, the pin hole formed at the other end side thereof in the cable longitudinal direction to be rotatably engaged with the connection pin, and the link side locking part disposed between the connection pin and the pin hole in the cable longitudinal direction. The holding member includes the base part to be engaged with the link side locking part and the holding part, which extends from the base part toward two outer sides of the multi-joint link width direction and is in contact with the cable to hold the cable, and the base part and the holding part are formed integrally with each other. One of the link side locking part and the base part includes the pair of locking concaves arranged in the multi joint link width direction while the other one of the link side locking part and the base part includes the pair of locking claws arranged in the multi joint link width direction and extending in the link flexional inner-outer direction to be engaged with the pair of locking concaves respectively. Since the holding member holds the cable and the cable does not slide relative to the holding member, abrasion of the cable skin of the cable can be prevented.

Further, in comparison with the conventional structure that uses a hollow link member to accommodate the cable therein, the link member of the present invention is compact and has less mass, which results in a smaller inertial force when the link member stops. Therefore, in comparison with the conventional structure that uses a hollow link member to accommodate the cable therein, the position of the multi-joint link of the present invention can be held with high precision.

Similarly, since the link member of the present invention is compact and has less mass, which results in a smaller inertial force when the link member is moved, the output of a power source of the device can be reduced.

In other words, a motor, etc., that serves as the power source can be miniaturized.

Additionally, the parts can be smaller and the number of the parts can be reduced to significantly decrease the production costs.

Moreover, in comparison with the conventional structure that uses a hollow link member to accommodate the cable therein, the link member of the present invention is formed compact to avoid collision between link members during movement. Therefore, the impact sound can be reduced.

In the situation of disposing multiple cables, the cables are arranged in parallel to each other along the multi-joint link width direction and have approximately the same bending radius when the cables are bent. Thus, problems such as breaking of the cables resulting from an excessive force on the cables caused by different bending radii can be avoided.

Additionally, in the situation that multiple cables are disposed and held respectively at two sides of the multi-joint link width direction, resilience due to a bending resistance of the cables held at one side is reduced or offset by the resilience generated in the same way at the other side. Therefore, the forces that twist the multi joint link in certain directions can be mostly nullified.

In other words, the forces at two sides of the multi-joint link width direction are well balanced, so as to prevent twisting the multi-joint link and smoothen the bending of the multi-joint link.

According to the cable protection and guide device of the second aspect of the present invention, in addition to the effects of the first aspect, one of the at least one part of the plurality of link members and the holding member includes the engaging pin that extends in the link flexional inner-outer direction while the other one of the at least one part of the plurality of link members and the holding member includes the engaging hole that extends in the link flexional inner-outer direction to be engaged with the engaging pin. Because the engaged portions of the link member and the holding member are increased, the engagement of the link member and the holding member can be strengthened.

In addition, because a relative position relationship of the link member and the holding member in a direction that intersects the link flexional inner-outer direction is restricted, the position and orientation of the cable relative to the link member can be stabilized.

According to the cable protection and guide device of the third aspect of the present invention, in addition to the effects of the first or second aspect, the holding part of the holding member includes two or more cable insertion holes, which are arranged in the cable longitudinal direction and penetrate the holding part in the link flexional inner-outer direction, and has flexibility, and the cable is alternately inserted into the holding member in the link flexional inner-outer direction. Because the holding part is bent to generate a holding force for holding the cable, the cable can be held without additional parts.

According to the cable protection and guide device of the fourth aspect of the present invention, in addition to the effects of the first or second aspect, the holding part of the holding member includes the plurality of through holes that are arranged in the multi-joint link width direction and penetrate the holding part in the link flexional inner-outer direction, and the cable is inserted into the fixing band that is a member other than the holding member and inserted into the through hole. Because the cable is held firmly by the exclusive fixing band, the sliding between the cable and the holding member can be prevented with certainty.

According to the cable protection and guide device of the fifth aspect of the present invention, in addition to the effects of any one of the first to the fourth aspects, the center line of the cable overlaps the line that connects the connection pin and the pin hole of the at least one part of the plurality of link members when the portion of the multi-joint link in the linear position is viewed from the multi-joint link width direction. Because a diameter of an arc of the multi joint link in the flexional position is the same as a diameter of an arc of the cable, the sliding between the holding part and the cable can be further avoided.

According to the cable protection and guide device of the sixth aspect of the present invention, in addition to the effects of any one of the first to the fifth aspects, the holding member is formed of a flexible material, and the link flexional outmost part of the holding member is disposed outer to the link flexional outmost part of the at least one part of the plurality of link members. When the holding member hits the support surface of the support body which serves as a reference surface during movement, the holding member is flexed to absorb the impact. Thus, in comparison with a holding member made of an inflexible material, the holding member of the present invention can reduce the noise.

According to the cable protection and guide device of the seventh aspect of the present invention, in addition to the effects of any one of the first to the sixth aspects, the holding member is attached to the at least one part of the plurality of link members at a link flexional inner side. When the cable is bent, the holding member receives a force from the cable at the flexional outer side and is pressed against the at least one part of the plurality of link members. Thus, in comparison with the situation of installing the holding member from the flexional outer side, the holding member of the present invention does not come off from the link member easily.

DESCRIPTION OF THE EMBODIMENTS

A cable protection and guide device of the present invention is not particularly limited as long as the cable protection and guide device includes a multi-joint link formed by connecting a plurality of link members in a cable longitudinal direction and is capable of taking a linear position to be in contact with a support surface of a support body and a flexional position to be separated from the support surface, to guide a cable or the like from a cable fixed end to a cable movable end, wherein the multi-joint link includes the plurality of link members and a holding member that is attached to at least one part of the plurality of link members for holding the cable; at least one part of the plurality of link members includes a connection pin formed at one end side thereof in the cable longitudinal direction, a pin hole formed at the other end side thereof in the cable longitudinal direction to be rotatably engaged with the connection pin, and a link side locking part disposed between the connection pin and the pin hole in the cable longitudinal direction; the holding member includes a base part to be engaged with the link side locking part and a holding part that extends from the base part toward two outer sides of a multi-joint link width direction to be in contact with the cable for holding the cable, and the base part and the holding part are formed integrally with each other; and one of the link side locking part and the base part includes a pair of locking concaves arranged in the multi-joint link width direction while the other one of the link side locking part and the base part includes a pair of locking claws arranged in the multi-joint link width direction and extending in a link flexional inner-outer direction to be engaged with the pair of locking concaves respectively, thereby preventing abrasion of the cable skin of the cable and holding the position of the multi-joint link with high precision.

For example, a material of the link member used in the cable protection and guide device of the present invention may be a synthetic resin, such as engineering resin, etc., or a metal, such as aluminum, etc.

In addition, a shape of the link member is not particularly limited as long as the link member can be connected with one another in the cable longitudinal direction and be moved relatively by bending back the cable between the cable fixed end and the cable movable end in the cable longitudinal direction.

Also, the cable may be any flexible linear object, such as an electric cable or a hose that is used in a machine for supplying electricity, transmitting signals, or conducting material containing fluid.

First Embodiment

Below a cable protection and guide device 100 of the first embodiment of the present invention is described on the basis of FIGS. 1 to 6B.

Figure 1:
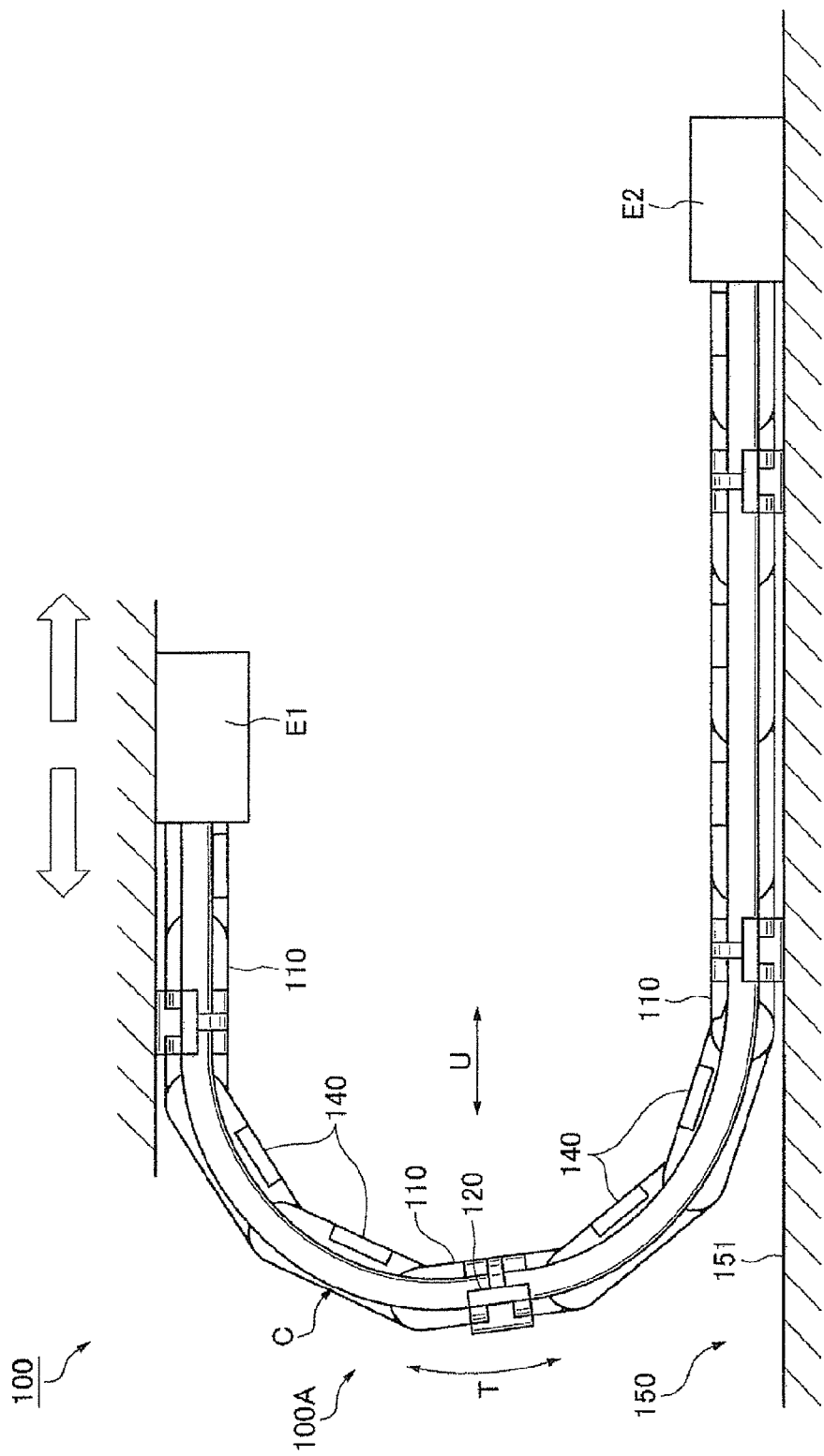
FIG. 1 is a schematic view illustrating a cable protection and guide device of the first embodiment of the present invention.
Figure 2:
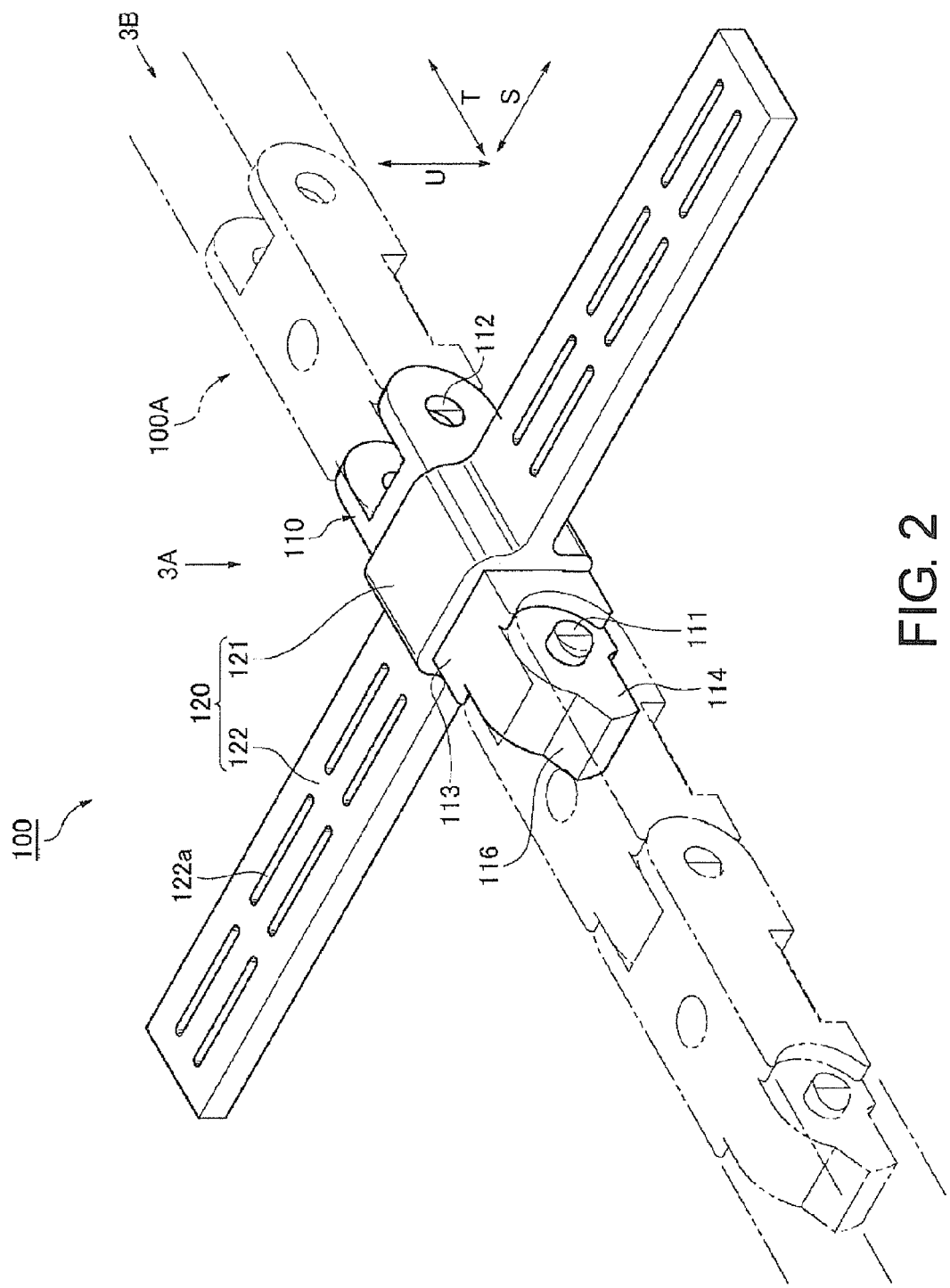
FIG. 2 is a perspective view illustrating a first link member and a holding member of the first embodiment of the present invention.
Figure 3A:
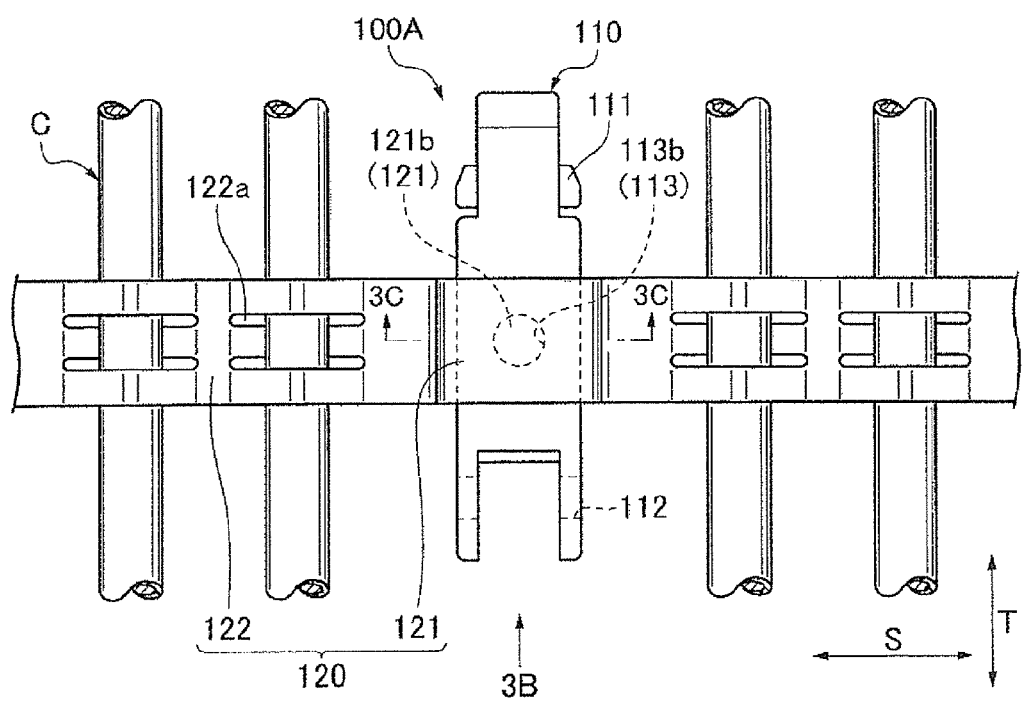
FIGS. 3A to 3C are schematic views illustrating a multi-joint link and a cable and the like of the first embodiment of the present invention.
Figure 3B:
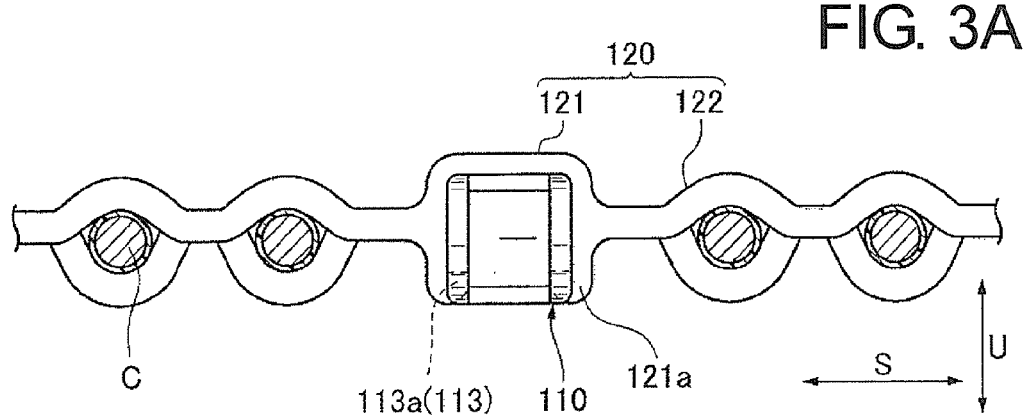
Figure 3C:
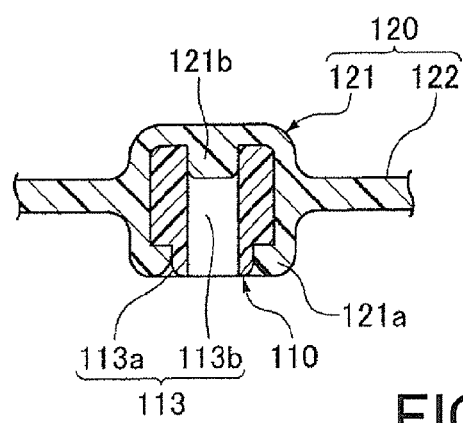
Figure 4A:
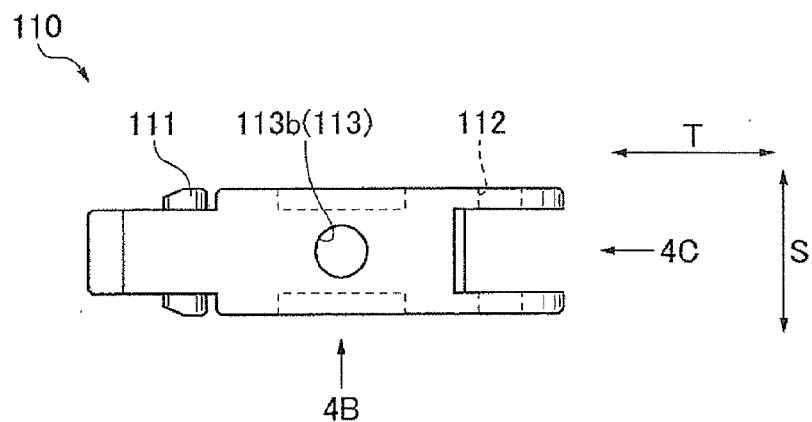
FIGS. 4A to 4C are schematic views illustrating the first link member of the first embodiment of the present invention.
Figure 4B:
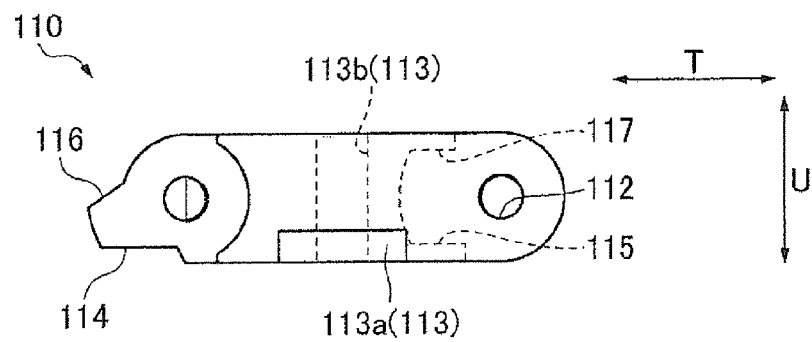
Figure 4C:
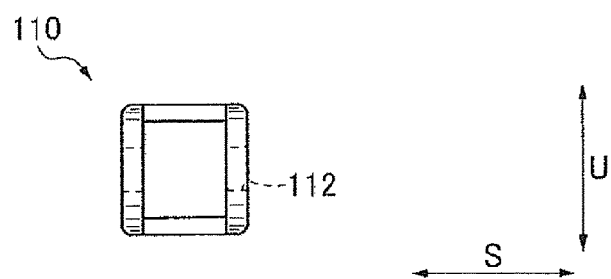
Figure 5A:
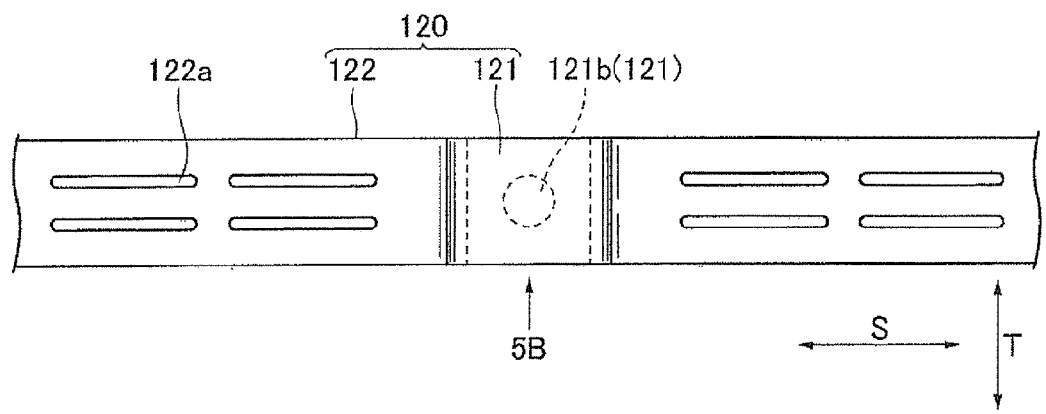
FIGS. 5A to 5B are schematic views illustrating the holding member of the first embodiment of the present invention.
Figure 5B:
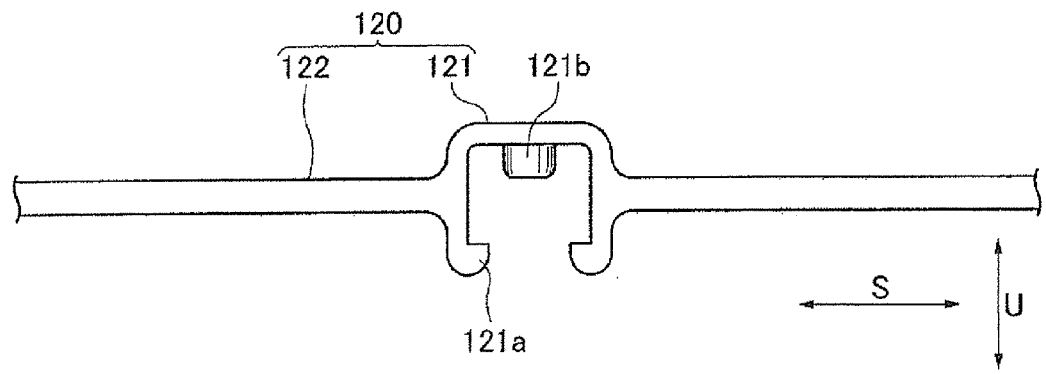
Figure 6A:
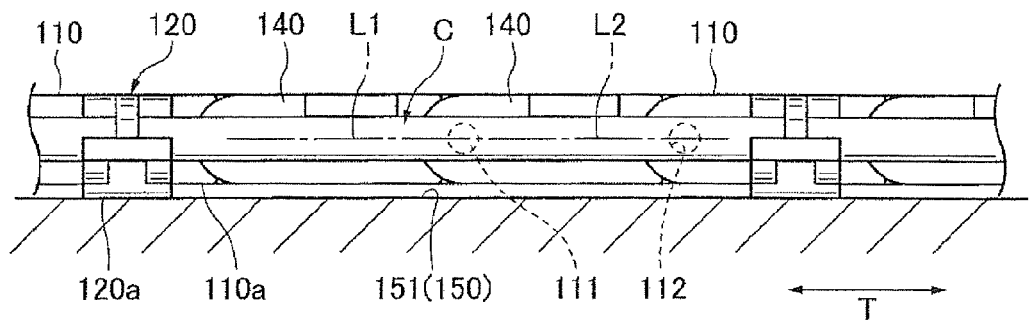
FIGS. 6A to 6B are schematic views respectively illustrating a linear position and a flexional position of the cable protection and guide device of the first embodiment of the present invention.
Figure 6B:
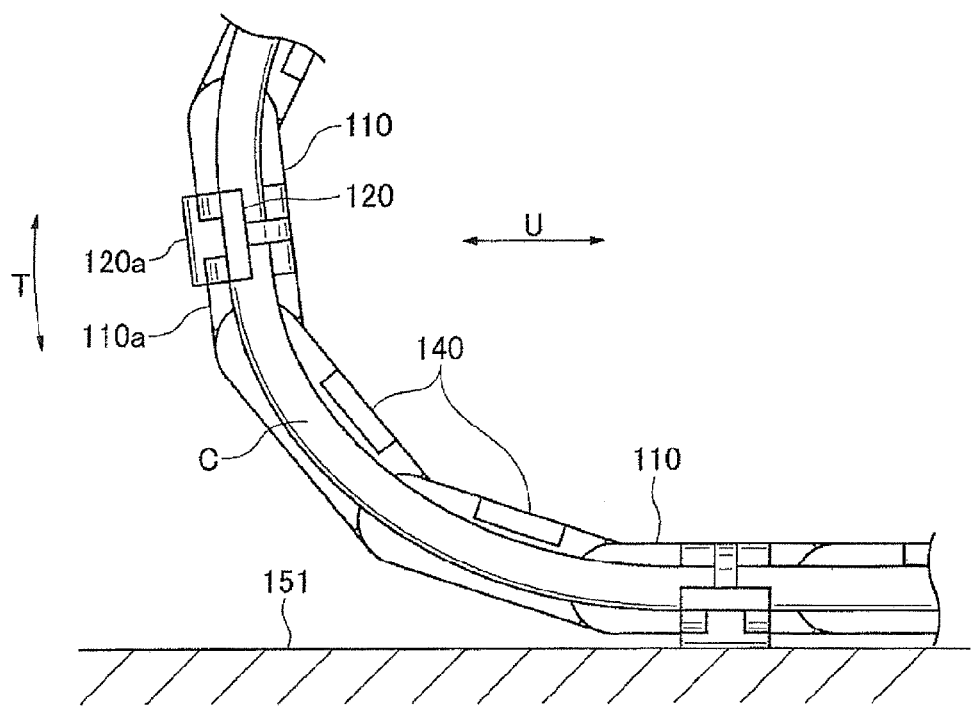

FIG. 1 is a schematic view illustrating the cable protection and guide device 100 of the first embodiment of the present invention. FIG. 2 is a perspective view illustrating a first link member 110 and a holding member 120 of the first embodiment of the present invention. FIG. 3A is a schematic view illustrating a multi-joint link 100A and a cable C and the like of the first embodiment of the present invention when viewed from a flexional outer side of the multi joint link 100A. FIG. 3B is a schematic view from the arrow 3B shown in FIG. 3A. FIG. 3C is a cross-sectional view along the line 3C-3C shown in FIG. 3A. FIG. 4A is a schematic view of the first link member 110 of the first embodiment of the present invention when viewed from the flexional outer side of the multi-joint link 100A. FIG. 4B is a schematic view from the arrow 4B shown in FIG. 4A. FIG. 4C is a schematic view from the arrow 4C shown in FIG. 4A. FIG. 5A is a schematic view illustrating the holding member 120 of the first embodiment of the present invention when viewed from the flexional outer side of the multi-joint link 100A. FIG. 5B is a schematic view from the arrow 5B shown in FIG. 5A. FIG. 6A is a schematic view illustrating the multi-joint link 100A in the linear position and the cable C when viewed from a multi joint link width direction S. FIG. 6B is a schematic view illustrating the multi-joint link 100A in the flexional position and the cable C when viewed from the multi-joint link width direction S.

The cable C and the like are depicted in FIG. 3A and FIG. 3B. It should be noted that the cable C and the like are omitted from FIG. 2 in order to facilitate the illustration of the shape of the holding member 120.

As shown in FIGS. 1 to 6B, the cable protection and guide device 100 of the first embodiment of the present invention is provided in a machine (not shown), which includes the cable C, and used for protecting and guiding the cable C.

The aforementioned machine may be a semiconductor fabrication apparatus, a pharmaceutical development and test apparatus, a vehicle door opening and closing device, or a machine tool, for example.

The cable protection and guide device 100 includes the multi-joint link 100A that is formed by connecting a plurality of link members (110, 140) in a cable longitudinal direction T. The cable protection and guide device 100 is disposed to guide the cable C from a cable fixed end E2 to a cable movable end E1, and take the linear position to be in contact with a support surface 151 of a support body 150 and take a flexional position to be separated from the support surface 151.

The multi-joint link 100A includes the first link member 110 and the second link member 140, which serve as the plurality of link members, and the holding member 120. The holding member 120 is attached to the first link member 110, which serves as at least a part of the plurality of link members, to hold the cable C.

Here, the first link member 110 is the part that the holding member 120 is attached to.

The holding member 120 is not attached to the second link member 140.

The structure of the second link member 140 is substantially the same as the structure of the first link member 110. The only difference is that the second link member 140 does not have the below-described link side locking part 113, or alternatively the second link member 140 has the link side locking part 113 but the holding member 120 is not attached thereto. Therefore, details of the structure of the second link member 140 will be omitted.

According to the present invention, at least the first link member 110 may be used as a part of the multi-joint link 100A and connected in plural in the cable longitudinal direction T to form the multi-joint link 100A.

In other words, the second link member 140 may be disposed and connected between one first link member 110 and another first link member 110, or a plurality of the first link members 110 may be connected without the second link member 140 therebetween.

The first link member 110 includes a connection pin 111, a pin hole 112, and the link side locking part 113. The connection pin 111 is formed at one end side of the first link member 110 in the cable longitudinal direction T. The pin hole 112 is formed at the other end side in the cable longitudinal direction T to be rotatably engaged with another connection pin 111. The link side locking part 113 is disposed between the connection pin 111 and the pin hole 112 in the cable longitudinal direction T.

Moreover, the holding member 120 includes a base part 121 and a holding part 122 that are formed integrally with each other. The base part 121 is to be engaged with the link side locking part 113. The holding part 122 extends from the base part 121 toward two outer sides of the multi joint link width direction S and is in contact with the cable C so as to hold the cable C.

Further, the link side locking part 113, which is one of the link side locking part 113 and the base part 121, includes a pair of locking concaves 113a arranged in the multi-joint link width direction S.

The base part 121, which is the other one of the link side locking part 113 and the base part 121, includes a pair of locking claws 121a arranged in the multi-joint link width direction S and extending in a link flexional inner-outer direction U to be engaged with the pair of locking concaves 113a respectively.

In this way, the cable C is held by the holding member 120 and does not slide relative to the holding member 120.

In comparison with the conventional structure that uses a hollow link member to accommodate the cable C therein, the link members (110, 140) of the present invention are formed compact with less mass to reduce an inertial force when the link members stop.

Similarly, the link members (110, 140) are formed compact with less mass to reduce the inertial force during movement.

In other words, a motor, etc., that serves as a power source can be miniaturized.

Since the parts are reduced in size and the number of the parts is also reduced, the fabrication costs can be lowered significantly.

Moreover, in comparison with the conventional structure that uses a hollow link member to accommodate the cable C therein, the link members (110, 140) of the present invention are compactly formed to reduce collision between the link members (110, 140) during movement.

In the situation of disposing multiple cables C, the cables C are arranged in parallel to each other along the multi-joint link width direction S and have approximately the same bending radius when the cables C are bent.

Additionally, in the situation that multiple cables C are disposed and held respectively at two sides along the multi joint link width direction S, resilience due to the bending resistance of the cables C held at one side is reduced or offset by the resilience generated in the same way at the other side.

In other words, the forces at two sides of the multi-joint link width direction S are well balanced to prevent twisting the multi-joint link 100A and to smoothen the bending of the multi-joint link 100A.

To be more specific, as shown in FIGS. 4A to 4C, the first link member 110 includes the connection pin 111, the pin hole 112, the locking concaves 113a and an engaging hole 113b serving as the link side locking part 113, a one end side linear position holding surface 114, an other end side linear position holding surface 115, a one end side flexional position restricting surface 116, and an other end side flexional position restricting surface 117.

Among the above, the connection pin 111 is disposed at one end side of the first link member 110 in the cable longitudinal direction T and protrudes toward two sides of the multi-joint link width direction S.

The pin hole 112 is formed at the other end side of the first link member 110 in the cable longitudinal direction T to be rotatably engaged with the connection pin 111 of the adjacent first link member 110 in the cable longitudinal direction T.

The locking concaves 113a of the link side locking part 113 are disposed in pair between the connection pin 111 and the pin hole 112 of the first link member 110 in the cable longitudinal direction T.

Moreover, the one end side linear position holding surface 114 is formed at one end side of the first link member 110 in the cable longitudinal direction T while the other end side linear position holding surface 115 is formed at the other end side of the first link member 110 in the cable longitudinal direction T.

When the multi-joint link 100A is in the linear position, the one end side linear position holding surface 114 of one first link member 110 is in surface contact with the other end side linear position holding surface 115 of the adjacent second link member 140 (or the adjacent first link member 110) in the cable longitudinal direction T.

Similarly, the one end side flexional position restricting surface 116 is formed at one end side of the first link member 110 in the cable longitudinal direction T while the other end side flexional position restricting surface 117 is formed at the other end side of the first link member 110 in the cable longitudinal direction T.

Thus, when the multi joint link 100A is in the flexional position, the one end side flexional position restricting surface 116 of one first link member 110 is in surface contact with the other end side flexional position restricting surface 117 of the adjacent second link member 140 (or the adjacent first link member 110) in the cable longitudinal direction T.

That is, one first link member 110 and the adjacent second link member 140 (or the adjacent first link member 110) are slightly bent at an obtuse angle, and a part of the multi-joint link 100A becomes the flexional position and is arc-shaped.

As a result, the cable C is bent like an arc without being folded.

Further, with reference to FIGS. 5A to 5B, the holding member 120 includes base part 121 and the holding part 122 that are integrally formed.

Herein, the base part 121 has locking claws 121a. Arms of the locking claws 121a are disposed in pair in the multi-joint link width direction S and extend in the link flexional inner-outer direction U.

The locking claws 121a of the holding member 120 are disposed to be engaged with the locking concaves 113a of the first link member 110.

The holding member 120, which is one of the first link member 110 and the holding member 120, has an engaging pin 121b that extends in the link flexional inner-outer direction U.

The first link member 110, which is the other one of the first link member 110 and the holding member 120, has an engaging hole 113b that extends in the link flexional inner-outer direction U to be engaged with the engaging pin 121b, as shown in FIG. 4A and FIG. 4B.

In this way, the engaged portions of the first link member 110 and the holding member 120 are increased.

In addition, a relative position relationship of the first link member 110 and the holding member 120 in a direction that intersects the link flexional inner-outer direction U is restricted.

The holding member 120 is formed using a flexible material. The holding part 122 of the holding member 120 has cable insertion holes 122a that are arranged in pair or more in the cable longitudinal direction T and penetrate the holding part 122 in the link flexional inner-outer direction U.

As shown in FIG. 3A and FIG. 3B, the cable C and the like are alternately inserted into the holding member 120 in the link flexional inner-outer direction U.

Accordingly, the holding part 122 is bent to generate a holding force for holding the cable C.

Further, when a portion of the multi-joint link 100A, which is in the linear position, is viewed from the multi-joint link width direction S, as shown in FIG. 6A, a center line L1 of the cable C overlaps a line L2 that connects the connection pin 111 and the pin hole 112 of the first link member 110.

Thus, as shown in FIG. 6B, a diameter of an arc of the multi-joint link 100A in the flexional position is the same as a diameter of an arc of the cable C and there is no position difference.

In addition, as described above, the holding member 120 is formed using a flexible material.

As shown in FIG. 6A and FIG. 6B, a link flexional outmost part 120a of the holding member 120 is located outer to a link flexional outmost part 110a of the first link member 110.

Therefore, when the holding member 120 hits the support surface 151 of the support body 150 which serves as a reference surface during movement, the holding member 120 is flexed to absorb the impact.

That is, noise can be reduced.

Besides, because the holding member 120 can be easily deformed during assembly, the holding member 120 can be attached to the first link member 110 easily.

In this embodiment, the holding member 120 is attached to the first link member 110 at the flexional outer side. However, the holding member 120 may be attached to the first link member 110 at the flexional inner side.

Therefore, when the cable C is bent, the holding member 120 receives a force from the cable C at the flexional outer side and is pressed against the first link member 110.

That is, in comparison with the situation of attaching the holding member 120 at the flexional outer side, the holding member 120 of this embodiment does not come off from the link member easily.

The locking concaves 113a are formed on the first link member 110 while the locking claws 121a are formed on the holding member 120. However, the locking concaves 113a and the locking claws 121a may be arranged reversely; that is, the locking claws 121a may be formed on the first link member 110 while the locking concaves 113a may be formed on the holding member 120.

In addition, two or three or more multi-joint links 100A may be disposed in the multi-joint link width direction S if required.

Accordingly, in the case that the number of the cables C increases, the cables C can still be steadily supported.

Multiple multi joint links 100A may also be stacked in the link flexional inner-outer direction U.

Accordingly, in the case that there is limited space in the multi-joint link width direction S, multiple cables C can still be supported.

In the cable protection and guide device 100 of the first embodiment of the present invention that is obtained according to the above, the multi-joint link 100A includes the first link member 110 and the second link member 140, which serve as the plurality of link members, and the holding member 120, which is attached to the first link member 110, as at least one part of the plurality of link members, for holding the cable C. The first link member 110 includes the connection pin 111 formed at one end side thereof in the cable longitudinal direction T, the pin hole 112 formed at the other end side thereof in the cable longitudinal direction T to be rotatably engaged with the connection pin 111, and the link side locking part 113 disposed between the connection pin 111 and the pin hole 112 in the cable longitudinal direction T. The holding member 120 includes the base part 121 to be engaged with the link side locking part 113 and the holding part 122 that extends from the base part 121 toward two outer sides of the multi-joint link width direction S to be in contact with the cable C for holding the cable C, wherein the base part 121 and the holding part 122 are formed integrally with each other. One of the link side locking part 113 and the base part 121 has the locking concaves 113a that are arranged in pair in the multi-joint link width direction S while the other one of the link side locking part 113 and the base part 121 has the locking claws 121a that are arranged in pair in the multi-joint link width direction S and extend in the link flexional inner-outer direction U to be engaged with the pair of locking concaves 113a respectively. Thus, abrasion of the cable skin of the cable C can be prevented and, when compared with the conventional structure that uses a hollow link member to accommodate the cable C therein, the position of the multi-joint link 100A can be held with high precision, the output of the power source of the device can be reduced, the impact sound can be reduced, problems such as breaking of the cable C resulting from an excessive force on the cable C caused by different bending radii can be avoided, and the forces that twist the multi joint link 100A in certain directions can be mostly nullified.

Furthermore, one of the first link member 110 and the holding member 120 has the engaging pin 121b that extends in the link flexional inner-outer direction U while the other one of the first link member 110 and the holding member 120 has the engaging hole 113b that extends in the link flexional inner-outer direction U to be engaged with the engaging pin 121b. Accordingly, the engagement of the first link member 110 and the holding member 120 can be strengthened and the position and orientation of the cable C relative to the first link member 110 can be stabilized.

Moreover, the holding part 122 of the holding member 120 has the cable insertion holes 122a, which are arranged in pair or more in the cable longitudinal direction T and penetrate the holding part 122 in the link flexional inner-outer direction U, and has flexibility. By inserting the cable C and the like alternately into the holding member 120 in the link flexional inner-outer direction U, the cable C and the like can be held without additional parts.

Further, when the portion of the multi-joint link 100A, which is in the linear position, is viewed from the multi-joint link width direction S, the center line L1 of the cable C overlaps the line L2 that connects the connection pin 111 and the pin hole 112 of the first link member 110. Accordingly, sliding between the holding part 122 and the cable C can be prevented with certainty.

The holding member 120 is formed using a flexible material, and the link flexional outmost part 120a of the holding member 120 is located outer to the link flexional outmost part 110a of the first link member 110. Accordingly, the holding member 120 made of the flexible material can reduce noise with great effectiveness when compared with a holding member (120) made of an inflexible material.

Second Embodiment

Figure 7A:
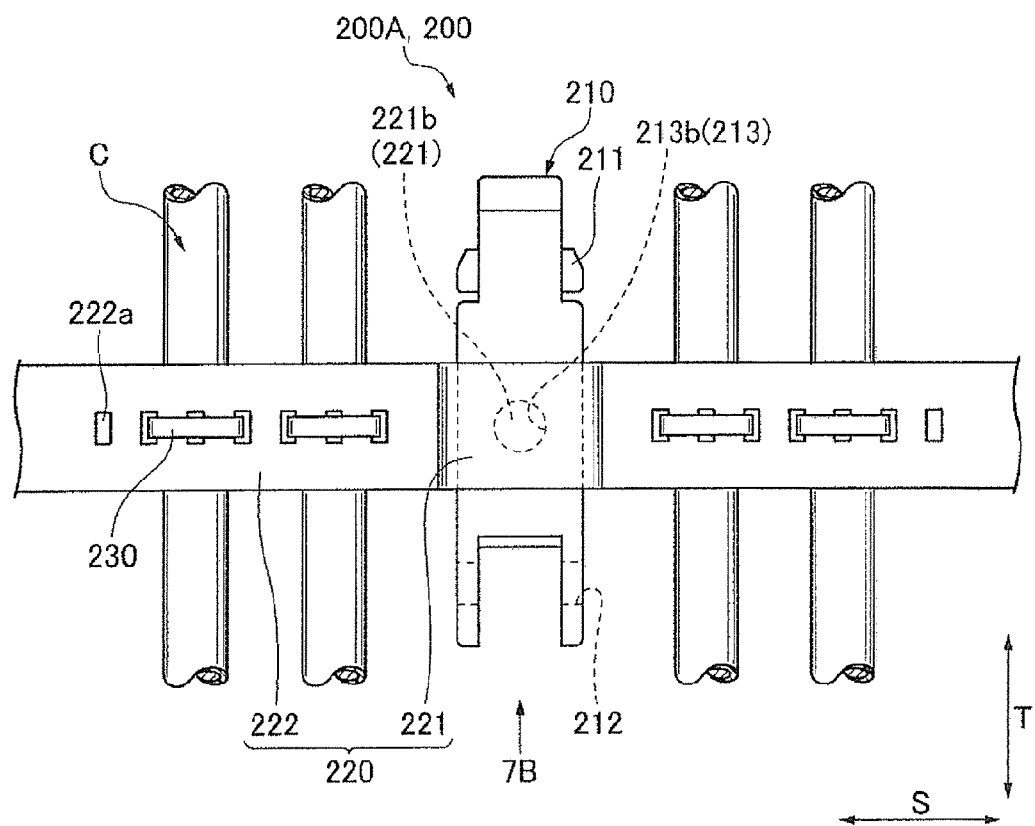
FIGS. 7A to 7B are schematic views illustrating a multi-joint link and a cable and the like of the second embodiment of the present invention.
Figure 7B:
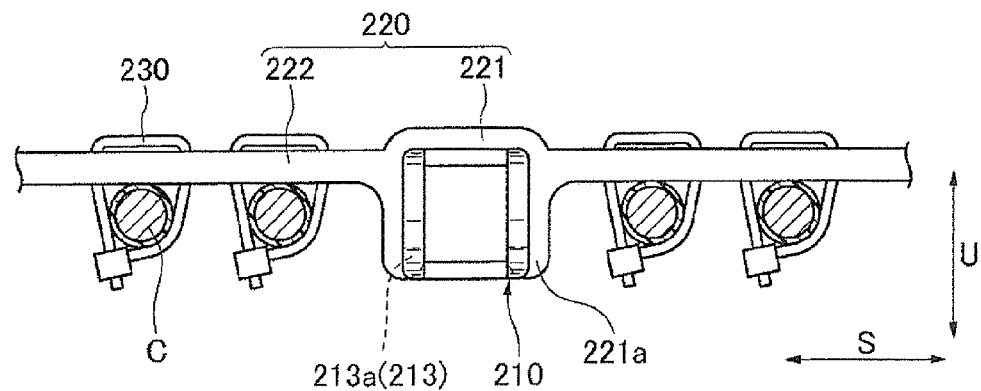

Further to the above, a cable protection and guide device 200 of the second embodiment of the present invention is described on the basis of FIG. 7A and FIG. 7B.

Here, FIG. 7A is a schematic view illustrating a multi-joint link 200A and the cable C of the second embodiment of the present invention when viewed from the flexional outer side. FIG. 7B is a schematic view from the arrow 7B shown in FIG. 7A.

A holding part 222 of a holding member 220 of the cable protection and guide device 200 of the second embodiment is positioned and shaped differently from the holding part 122 of the holding member 120 of the cable protection and guide device 100 of the first embodiment, and the cable protection and guide device 200 further includes a fixing band 230. Otherwise, the cable protection and guide device 200 and the cable protection and guide device 100 have many elements in common, which are not repeated hereinafter and are assigned with reference numerals starting with 2 (i.e. 2XX) in the second embodiment whereas the last two digits "XX" remain unchanged.

As shown in FIG. 7A and FIG. 7B, the cable protection and guide device 200 of the second embodiment of the present invention includes a first link member 210, which serves as at least one part of the plurality of link members, the holding member 220, and the fixing band 230, which is a binding band made of a known resin.

Herein, the holding part 222 of the holding member 220 has a plurality of through holes 222a arranged in the multi-joint link width direction S and penetrating in the link flexional inner-outer direction U.

The fixing band 230 is attached to the through hole 222a.

Then the cable C is inserted into the fixing band 230 that is provided as a separate member and inserted into the through hole 222a.

Accordingly, the cable C is held firmly by the exclusive fixing band 230.

Moreover, in comparison with the holding part 122 of the holding member 120 of the first embodiment, the holding part 222 of the holding member 220 is formed at an outer side of a link flexional direction, so that the center line L1 of the cable C overlaps the line L2 that connects a connection pin 211 and a pin hole 212 of the first link member 210 when a portion of the multi joint link 200A in the linear position is viewed from the multi-joint link width direction S.

Therefore, the same as the first embodiment illustrated in FIG. 6B, a diameter of an arc of the multi-joint link 200A in the flexional position is the same as the diameter of the arc of the cable C and there is no position difference.

In the cable protection and guide device 200 of the second embodiment of the present invention that is obtained according to the above, the holding part 222 of the holding member 220 has the plurality of through holes 222a arranged in the multi-joint link width direction S and penetrating in the link flexional inner-outer direction U, and the cable C is inserted into the fixing band 230 that is provided as a separate member and inserted into the through hole 222a. Accordingly, it is highly effective in preventing the sliding between the cable C and the holding member 220 with certainty.

What is claimed is:

1. A cable protection and guide device, comprising:
a multi-joint link comprising a plurality of link members connected in a cable longitudinal direction, wherein the cable protection and guide device guides a cable from a cable fixed end to a cable movable end, the multi-joint link comprises a liner portion and a flexional portion, wherein part of the link members are in contact with a support surface of a support body to form the linear portion and another part of the link members are slightly bent at an obtuse angle to form the arc-shaped flexional portion, and the flexional portion is separated from the support surface, the linear portion comprises a multi-joint link linear inner side and a multi-joint link linear outer side and the flexional portion comprises a multi-joint link flexional inner side and a multi-joint link flexional outer side, the multi-joint link linear inner side is connected to the multi-joint link flexional inner side, the multi-joint link linear outer side is connected to the multi-joint link flexional outer side, and at least part of the multi-joint link linear outer side is in contact with the support surface,
wherein the multi joint link comprises the plurality of link members and a holding member, which is attached to at least one part of the plurality of link members and holds the cable,
wherein the at least one part of the plurality of link members comprises a connection pin formed at one end side thereof in the cable longitudinal direction, a pin hole formed at the other end side thereof in the cable longitudinal direction to be rotatably engaged with the connection pin of another link member, and a link side locking part disposed between the connection pin and the pin hole in the cable longitudinal direction, wherein the holding member comprises a base part to be engaged with the link side locking part and a holding part, which extends from the base part toward two outer sides of a multi-joint link width direction and is in contact with the cable to hold the cable, and the base part and the holding part are formed integrally with each other, and wherein one of the link side locking part and the base part comprises a pair of locking concaves arranged in the multi-joint link width direction while the other one of the link side locking part and the base part comprises a pair of locking claws arranged in the multi-joint link width direction and extending in a link flexional inner-outer direction to be engaged with the pair of locking concaves respectively, and the multi-joint link width direction is perpendicular to the cable longitudinal direction.

2. The cable protection and guide device according to claim 1, wherein one of the at least one part of the plurality of link members and the holding member comprises an engaging pin that extends in the link flexional inner-outer direction while the other one of the at least one part of the plurality of link members and the holding member comprises an engaging hole that extends in the link flexional inner-outer direction to be engaged with the engaging pin.

3. The cable protection and guide device according to claim 1, wherein the holding part of the holding member comprises two or more cable insertion holes, which are arranged in the cable longitudinal direction and penetrate the holding part in the link flexional inner-outer direction, and has flexibility, and the cable is alternately inserted into the holding member in the link flexional inner-outer direction.

4. The cable protection and guide device according to claim 1, wherein the holding part of the holding member comprises a plurality of through holes that are arranged in the multi-joint link width direction and penetrate the holding part in the link flexional inner-outer direction, and the cable is inserted into a fixing band that is a member other than the holding member and inserted into the through hole.

5. The cable protection and guide device according to claim 1, wherein a center line of the cable overlaps a line that connects the connection pin and the pin hole of the at least one part of the plurality of link members when a portion of the multi-joint link in the linear position is viewed from the multi-joint link width direction.

6. The cable protection and guide device according to claim 1, wherein the holding member is formed of a flexible material, and a link flexional outmost part of the holding member is disposed outer to a link flexional outmost part of the at least one part of the plurality of link members.

7. The cable protection and guide device according to claim 1, wherein the holding member is installed to the at least one part of the plurality of link members from a link flexional inner side.

* * * * *